(12) United States Patent
Panciroli et al.

(10) Patent No.: US 11,549,452 B2
(45) Date of Patent: Jan. 10, 2023

(54) METHOD TO CONTROL THE COMBUSTION OF AN INTERNAL COMBUSTION ENGINE

(71) Applicant: MARELLI EUROPE S.P.A., Corbetta (IT)

(72) Inventors: Marco Panciroli, Bologna (IT); Matteo De Cesare, Torremaggiore (IT); Riccardo Lanzoni, Imola (IT); Antonio Zito, Bologna (IT); Nicolò Cavina, Bologna (IT)

(73) Assignee: MARELLI EUROPE S.P.A., Corbetta (IT)

( * ) Notice: Subject to any disclaimer, the term of this patent is extended or adjusted under 35 U.S.C. 154(b) by 0 days.

(21) Appl. No.: 17/600,732

(22) PCT Filed: Apr. 1, 2020

(86) PCT No.: PCT/IB2020/053100
§ 371 (c)(1),
(2) Date: Oct. 1, 2021

(87) PCT Pub. No.: WO2020/202029
PCT Pub. Date: Oct. 8, 2020

(65) Prior Publication Data
US 2022/0195952 A1 Jun. 23, 2022

(30) Foreign Application Priority Data

Apr. 1, 2019 (IT) .......................... 102019000004875

(51) Int. Cl.
*F02D 41/00* (2006.01)
*F02D 35/02* (2006.01)
*F02D 41/14* (2006.01)

(52) U.S. Cl.
CPC ....... *F02D 41/0025* (2013.01); *F02D 35/023* (2013.01); *F02D 2041/1433* (2013.01); *F02D 2200/0411* (2013.01)

(58) Field of Classification Search
CPC ...... F02D 19/02; F02D 35/023; F02D 35/028; F02D 37/02; F02D 41/00; F02D 41/0025;
(Continued)

(56) References Cited

U.S. PATENT DOCUMENTS

| 2009/0266336 A1 | 10/2009 | Morimoto et al. |
| 2011/0174268 A1 | 7/2011 | Surnilla et al. |

(Continued)

FOREIGN PATENT DOCUMENTS

| DE | 102009002544 A1 | 10/2009 |
| EP | 3040541 A1 | 7/2016 |
| EP | 3128159 B1 | 6/2018 |

OTHER PUBLICATIONS

International Search Report and Written Opinion of the International Searching Authority for PCT International Application No. PCT/IB2020/053100 dated Aug. 10, 2020.
(Continued)

*Primary Examiner* — John Kwon
*Assistant Examiner* — Johnny H Hoang
(74) *Attorney, Agent, or Firm* — Howard & Howard Attorneys PLLC

(57) ABSTRACT

A method to control the combustion of an internal combustion engine, which comprises determining a combustion model, which provides a spark advance depending on an objective value of the rate of water to be injected, on the rotation speed, on the intake efficiency and on an open-loop contribution of a combustion index; calculating a first closed-loop contribution of the spark advance depending on the combustion index; calculating a second closed-loop
(Continued)

contribution of the spark advance depending on a quantity indicating the knocking energy; and calculating the objective value of the spark advance angle to be operated through the sum of the spark advance value provided by the combustion model and of the first closed-loop contribution or, alternatively, of the second closed-loop contribution.

18 Claims, 3 Drawing Sheets

(58) Field of Classification Search
CPC .. F02D 41/1451; F02D 41/18; F02D 41/2438; F02D 41/26; F02D 41/401; F02D 2200/0411; F02D 2200/06; F02D 2041/0015; F02D 2041/1433; F02D 2041/389
USPC .......................................... 701/101, 110–115
See application file for complete search history.

(56) References Cited

U.S. PATENT DOCUMENTS

2018/0328297 A1    11/2018   Ueno et al.
2020/0309070 A1*  10/2020   Panciroli ............... F02D 35/028

OTHER PUBLICATIONS

Cavina, Nicolo, et al., "Investigation of Water Injection Effects on Combustion Characteristics of a GDI TC Engine," SAE Int. J. Engines, vol. 10, No. 4, pp. 2209-2218 (2017).
Italian Patent Application No. 2016000115146 filed Nov. 15, 2016 (56 pages).
Italian Patent Application No. 2016000115205 filed Nov. 15, 2016 (55 pages).

* cited by examiner

METHOD TO CONTROL THE COMBUSTION OF AN INTERNAL COMBUSTION ENGINE

CROSS-REFERENCE TO RELATED APPLICATIONS

This patent application claims priority from Italian patent application no. 102019000004875 filed on Apr. 1, 2019, the entire disclosure of which is incorporated herein by reference.

TECHNICAL FIELD

The invention relates to a method to control the combustion of an internal combustion engine.

PRIOR ART

As it is known, when dealing with internal combustion engines, manufacturers suggested feeding water, in addition to fuel, into the combustion chambers defined inside the cylinders.

In an internal combustion engine, the water injection system consists of introducing water into the engine through the intake duct, in the form of spray, or mixed with fuel, or directly into a combustion chamber, so as to cool the air/fuel mixture, thus increasing the resistance to knock phenomena. The water feeding system typically comprises a tank, which is filled with demineralised water (in order to avoid the formation of scaling). The tank is normally filled from the outside of the vehicle or it could be filled using the condensate of the air conditioning system, exploiting the condensate of the exhaust or conveying rain water. Furthermore, the tank is preferably provided with an electric heating device (namely, provided with a resistance generating heat through Joule effect when it is flown through by an electric current), which is used to melt possible ice when the temperature on the outside is particularly low.

Water has a high latent heat of vaporization; in other words, it requires a lot of energy to shift from the liquid state to the gaseous state. When water at ambient temperature is injected into the intake duct, it absorbs heat from the air flowing in and from the metal walls, evaporating, thus cooling the substance flowing in. Hence, the engine takes in fresher air, in other words thicker air, the volumetric efficiency is improved and the knock possibility is reduced, furthermore more fuel can be injected. During the compression, the water present in very small drops evaporates and absorbs heat from the air being compressed, cooling it down and lowering the pressure thereof. After the compression, the combustion takes place and there is a further beneficial effect: during the combustion, a lot of heat develops, which is absorbed by the water, reducing the peak temperature of the cycle and reducing, as a consequence, the formation of Nox and the heat to be absorbed by the walls of the engine. This evaporation further transforms part of the heat of the engine (which would otherwise be wasted) into pressure, resulting from the vapour that was formed, thus increasing the thrust upon the piston and also increasing the flow of energy into a possible turbine of the exhaust (the turbine, furthermore, would benefit from the decrease in the temperature of the exhaust gases due to the absorption of heat by the additional water).

However, there still is a strong need to optimize the consumption of injected water in order to reduce the dimensions of and the space taken up by the water feeding system and in order not to compromise the thermodynamic efficiency.

DESCRIPTION OF THE INVENTION

Therefore, the object of the invention is to provide a method to control the combustion of an internal combustion engine, said method not suffering from the drawbacks described above and, in particular, being easy and economic to be implemented.

According to the invention, there is provided a method to control the combustion of an internal combustion engine according to the appended claims.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
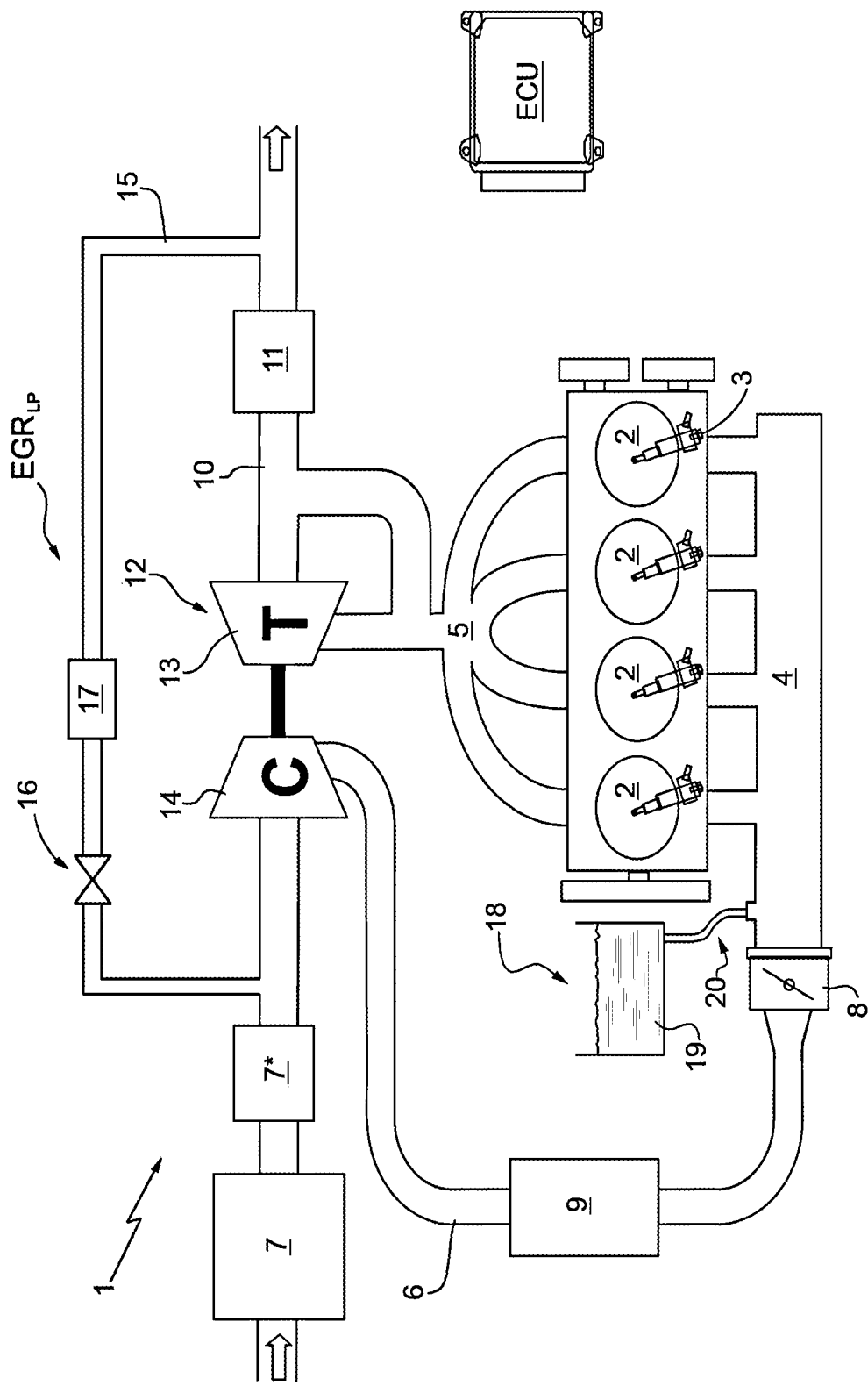
FIG. 1 is a schematic view of an internal combustion engine provided with an electronic control unit implementing the combustion control method according to the invention.

In FIG. 1, number 1 indicates, as a whole, an internal combustion engine for a road vehicle—car or motorcycle—(not shown) provided with a number of (in particular, four) cylinders 2, where respective variable volume combustion chambers are defined, and with four injectors 3, which directly inject fuel, preferably petrol, into the cylinders 2, each being connected to an intake manifold 4 by means of at least one respective intake valve (not shown) and to an exhaust manifold 5 by means of at least one respective exhaust valve (not shown).

The intake manifold 4 receives a gas mixture comprising both exhaust gases (as described more in detail below) and fresh air, i.e. air coming from the outside through an intake duct 6, which is provided with an air filter 7 for the fresh air flow and is regulated by a throttle valve 8. Along the intake pipe 6, downstream of the air filter 7, there also is an air flow meter 7*.

Along the intake duct 6 there is (preferably integrated inside the intake manifold 4) an intercooler 9, which fulfils the function of cooling the air taken in. The intercooler 9 is connected to a conditioning circuit for the cooling liquid used in the intercooler 9, which comprises a heat exchanger, a feeding pump and an adjustment valve, which are arranged along a duct in parallel to the intercooler 9. The exhaust manifold 5 is connected to an exhaust duct 10, which feeds the exhaust gases produced by the combustion to an exhaust system, which releases the gases produced by the combustion into the atmosphere and normally comprises at least one catalytic converter 11 and at least one silencer (not shown) arranged downstream of the catalytic converter 11.

The supercharging system of the internal combustion engine 1 comprises a turbocharger 12 provided with a turbine 13, which is arranged along the exhaust duct 10 so as to rotate at a high speed due to the action of the exhaust gases expelled from the cylinders 3, and a compressor 14, which is arranged along the intake duct 6 and is mechanically connected to the turbine 13 so as to be caused to rotate by the turbine 13 itself in order to increase the pressure of the air present in the feeding duct 6.

The internal combustion engine 1 is controlled by an electronic control unit ECU, which controls the operation of all the components of the internal combustion engine 1.

According to a preferred variant, the internal combustion engine 1 comprises a low pressure circuit $EGR_{LP}$, which comprises, in turn, a bypass duct 15 originating from the exhaust duct 10, preferably downstream of the catalytic converter 11, and leading into the intake duct 6, downstream of the air flow meter 7; the bypass duct 15 is connected in parallel to the turbocharger 12. Along the bypass duct 15 there is an EGR valve 16, which is designed to adjust the flow rate of the exhaust gases flowing through the bypass pipe 15. Along the bypass duct 15, upstream of the valve 16, there also is a heat exchanger 17, which fulfils the function of cooling the gases flowing out of the exhaust manifold 5 and into the compressor 14.

Finally, the internal combustion engine 1 comprises a water feeding and injection system 18.

The water feeding and injection system 18 allows for the introduction of water into the internal combustion engine 1 through the intake duct 6, in the form of spray, or mixed with fuel, or directly into a combustion chamber, so as to cool the air/fuel mixture, thus increasing the resistance to knock phenomena. The water feeding and injection system 18 is provided with a tank 19 to collect and store water, which is filled with demineralised water (in order to avoid the formation of scaling). The tank 19 is normally filled from the outside of the vehicle or it could be filled using the condensate of the air conditioning system, exploiting the condensate of the exhaust or conveying rain water. The water feeding and injection system 18 also comprises a volumetric pump, which draws from the tank in order to feed water under pressure to a known injection device 20. Furthermore, the tank 19 is preferably provided with an electric heating device (namely, provided with a resistance generating heat through Joule effect when it is flown through by an electric current), which is used to melt possible ice when the temperature on the outside is particularly low.

The strategy implemented by the electronic control unit ECU to optimize the combustion inside the internal combustion engine 1 through the injection of water is described below.

In particular, the following quantities are defined:

$\eta_{ASP}$ intake efficiency (representing the engine load or, alternatively, the indicated mean pressure or the indicated mean torque or the brake torque) defined by the ratio between the air mass $m_{AIR}$ trapped in the cylinder 2 for each combustion cycle and the air mass m -AIR REF trapped in the cylinder 2 for each combustion cycle under reference conditions (i.e. with a temperature of 298° K and at a pressure of one atmosphere);

n speed of the internal combustion engine 1;

$E_{det}$ knock energy (preferably defined through the difference between the combustion noise, which is determined through a proper treatment of a microphone or accelerometer signal within an angular detection window in a neighbourhood of the top dead centre TDC, and a limit combustion noise, which corresponds to the ninety-eighth percentile of non-knocking combustion cycles and is provided by a map stored inside the electronic control unit ECU, depending on the engine point and on the cylinder 2);

$E_{det-obj}$ limit value of the knocking energy, which is determined based on the engine point;

MAPO maximum amplitude (Maximum Amplitude Pressure Oscillation) of the intensity of the pressure waves generated by the combustion in the cylinders 2;

$MAPO_{obj}$ limit value of the maximum amplitude of the intensity of the pressure waves generated by the combustion in the cylinders 2, which is determined based on the engine point;

MFB50 combustion index (50% Mass Fraction Burnt) representing the engine angle (i.e. the crank angle) at which, inside the cylinder 2, 50% of the fuel mass was burnt;

R water rate equal to the ratio between the water mass $m_{H2O}$ and the fuel mass $m_{FUEL}$ injected for each cylinder 2;

$R_{obj}$ objective value of the water rate equal to the ratio between the water mass $m_{H2O}$ and the reference fuel mass $m_{FUEL}$ to be injected for each cylinder 1;

SA spark advance angle;

$SA_{obj}$ objective value of the spark advance to be operated.

According to a first variant shown in FIG. 1, the internal combustion engine 1 exclusively comprises the water feeding and injection system 18 (and is not provided with the low-pressure circuit $EGR_{LP}$); the combustion model used calculates the spark advance $SA_{model}$ depending on the (known) intake efficiency $\eta_{ASP}$, on the (known) speed n of the internal combustion engine 1, on the combustion index MFB50 and on the water rate $R_{obj}$.

In particular, the combustion model can be expressed by means of a parabola formulated as follows:

$$SA_{model}=a_2*MFB50^2+a_1*MFB50+a_0$$

Wherein $SA_{model}$ e MFB50 have the meaning explained above, whereas the coefficients $a_i$ can be expressed as follows:

$$a_i=f_i(\eta_{ASP},n)+g_i(R_{obj};\eta_{ASP})[i=0,1,2]$$

or, alternatively, by a polynomial model like the following one:

$$a_i=p00+n*p10+\eta_{ASP}*p01+n*\eta_{ASP}*p11+n^2*p20[i=0,1,2]$$

Wherein $R_{obj}$, n and $\eta_{ASP}$ have the meaning explained above.

The values of n and $\eta_{ASP}$ are known to the electronic control unit ECU.

The combustion index MFB50 and the water rate $R_{obj}$ are determined as follows.

The combustion index MFB50 is determined by means of an open-loop contribution; in particular, the electronic control unit ECU stores a map ($MFB50_{OL}$), which, based on the intake efficiency $\eta_{ASP}$ and on the speed n of the internal combustion engine 1, provides the combustion index MFB50.

The water rate $R_{obj}$, on the other hand, is determined by adding two open-loop contributions and a closed-loop (i.e. feedback) contribution.

The first open-loop contribution provides a water rate $R_{OL}$; in particular, the electronic control unit ECU stores a map ($R_{OL}$), which, based on the intake efficiency $\eta_{ASP}$ and on the speed n of the internal combustion engine 1, provides the water rate $R_{OL}$.

According to a first variant, the closed-loop contribution of the water rate $R_{obj}$ is obtained by comparing the knocking energy $E_{det}$ of the combustion cycle that just took place with the limit value $E_{det-obj}$ of the knocking energy.

Alternatively, the closed-loop contribution of the water rate $R_{obj}$ is obtained by comparing the maximum amplitude MAPO of the intensity of the pressure waves generated by the combustion in the cylinders 3 with the limit value MAPO$_{obj}$ of the maximum amplitude of the intensity of the pressure waves generated by the combustion in the cylinders 3.

The type of control to be operated is differentiated depending on the comparison between the knocking energy E$_{det}$ of the combustion cycle that just took place and the limit value E$_{det\text{-}obj}$ of the knocking energy (or, respectively, depending on the comparison between the maximum amplitude MAPO of the intensity of the pressure waves generated by the combustion in the cylinders 3 and the limit value MAPO$_{obj}$ of the maximum amplitude of the intensity of the pressure waves generated by the combustion in the cylinders 3); for example, the type of control takes place differentiating the constants of intervention of a PID (or PI) controller.

In particular, the strategy entails a governor block 1, which receives, as an input, the contribution calculated through the difference between the knocking energy E$_{det}$ of the combustion cycle that just took place and the limit value E$_{det\text{-}obj}$ of the knocking energy (or, respectively, through the difference between the maximum amplitude MAPO of the intensity of the pressure waves generated by the combustion in the cylinders 3 and the limit value MAPO$_{obj}$ of the maximum amplitude of the intensity of the pressure waves generated by the combustion in the cylinders 3) multiplied by the constant of intervention of the PID controllers. The governor block 1, depending on the value assumed by said contribution, decides how to intervene in order to reduce the risk of knock. In particular, in case the contribution is smaller than a threshold value S1 (which can preferably be adjusted and changed based on the engine point), this means that a small correction is needed in order to avoid the occurrence of knock phenomena. In this case, the governor block calculates a differential of the water rate ΔR$_{KNOCK}$ suited to avoid the occurrence of knock phenomena.

On the other hand, in case the contribution exceeds the threshold value S1, this means that a significant correction is needed in order to avoid the occurrence of knock phenomena. In this case, the governor block 1 calculates a differential of the spark advance ΔSA$_{KNOCK}$ suited to avoid the occurrence of knock phenomena. In this case, as described more in detail below, the water rate R$_{obj}$ is rounded to a limit value.

Finally, in case knocking phenomena DET are detected, the contribution is immediately rounded to a maximum value without waiting for the response of the PID controller, so that the governor block 1 calculates a differential of the spark advance ΔSA$_{KNOCK}$ suited to avoid the occurrence of knock phenomena.

According to a preferred variant, there is a second open-loop contribution, which provides an adaptive water rate R$_{ADT}$; in particular, the electronic control unit ECU stores a map (R$_{ADT}$), which, based on the intake efficiency η$_{ASP}$ and on the speed n of the internal combustion engine 1, provides the adaptive water rate R$_{ADT}$. Said map is preferably updated depending on the integral part of the PID or PI controller used by the closed-loop contribution to determine the differential of the water rate ΔR$_{KNOCK}$ under stationary conditions.

Therefore, the water rate R$_{obj}$ is determined by adding the two open-loop contributions R$_{ADT}$ and R$_{OL}$, and the closed-loop contribution ΔR$_{KNOCK}$.

The strategy further entails a closed-loop contribution to optimize the efficiency. In particular, said closed-loop contribution is obtained by comparing the combustion index MFB50 (determined by means of the open-loop contribution as described above) and an estimated value of the combustion index MFB50$_{est}$.

The type of control to be operated is differentiated depending on the result of the comparison between the combustion index MFB50 and the estimated value of the combustion index MFB50$_{est}$; for example, the type of control takes place differentiating the constants of interventions of a PID (or PI) controller.

In particular, the strategy entails a governor block 2, which receives, as an input, the contribution calculated through the difference between the combustion index MFB50 and the estimated value of the combustion index MFB50$_{est}$ multiplied by the constants of interventions of the PID or PI controller. The governor block, depending on the value assumed by said contribution, decides how to intervene in order to optimize the efficiency of the internal combustion engine 1. In particular, in case the contribution exceeds a threshold value S2 (which can preferably be adjusted and changed based on the engine point), this means that a significant correction is needed in order to optimize the efficiency of the internal combustion engine 1. In this case, the governor block calculates a differential of the spark advance ΔSA$_{MFB50}$ suited to optimize the efficiency of the internal combustion engine 1.

Clearly, in order to carry out the knock control and avoid the occurrence of knock phenomena, the differential of the spark advance ΔSA$_{KNOCK}$ reduces the spark advance SA$_{model}$ provided by the combustion model. On the contrary, in order to optimize the efficiency of the internal combustion engine 1, the differential of the spark advance ΔSA$_{MFB50}$ increases the spark advance SA$_{model}$ provided by the combustion model. The protection of the internal combustion engine 1 to avoid the occurrence of knock phenomena is preferred at the expense of the efficiency of the internal combustion engine 1; this means that the differential of the spark advance ΔSA$_{MFB50}$ suited to optimize the efficiency of the internal combustion engine 1 is reduced to zero (or significantly reduced) when the differential of the spark advance ΔSA$_{KNOCK}$ suited to avoid the occurrence of knock phenomena intervenes in order to reduce the spark advance SA$_{model}$ provided by the combustion model. In other words, the strategy entails cancelling (or rounding to a value close to zero) the differential of the spark advance ΔSA$_{MFB50}$ as soon as the differential of the spark advance ΔSA$_{KNOCK}$ starts reducing the value of the spark advance SA$_{model}$ provided by the combustion model.

Therefore, the objective advance SA$_{obj}$ to be operated is obtained from the sum of two different contributions: the spark advance SA$_{model}$ provided by the combustion model and the differential of the spark advance ΔSA$_{MFB50}$ suited to optimize the efficiency of the internal combustion engine 1 or, alternatively, the differential of the spark advance ΔSA$_{KNOCK}$ suited to avoid the occurrence of knock phenomena.

According to a variant, the internal combustion engine 1 comprises both the water feeding system 18 and the low-pressure circuit EGR$_{LP}$. In this case, the quantity (or ratio) R$_{EGR}$, which indicates the incidence of the low-pressure circuit EGR$_{LP}$ on the gas mixture flowing through the intake duct 6, is defined as follows:

$$R_{EGR} = M_{EGR\_LP} / M_{TOT}$$

M$_{TOT}$ mass of the gas mixture flowing in the intake duct 6, obtained by adding the mass M$_{AIR}$ of fresh air coming from the outside, which flows in the intake duct 6, and the mass $M_{EGR\_LP}$ of exhaust gases recirculated through the low-pressure circuit $EGR_{LP}$, which flows in the intake duct 6; and $M_{EGR\_LP}$ mass of exhaust gases recirculated through the low-pressure circuit $EGR_{LP}$, which flows in the intake duct 6.

In the description below, the quantity $R_{EGR}$ (used, for example, in the combustion model, as described more in detail below) can alternatively be determined either through any one of the methods described in documents EP-A1-3040541, EP-B1-3128159, IT2016000115146, IT2016000115205 or through an outflow model of the EGR valve 16.

Figure 3:
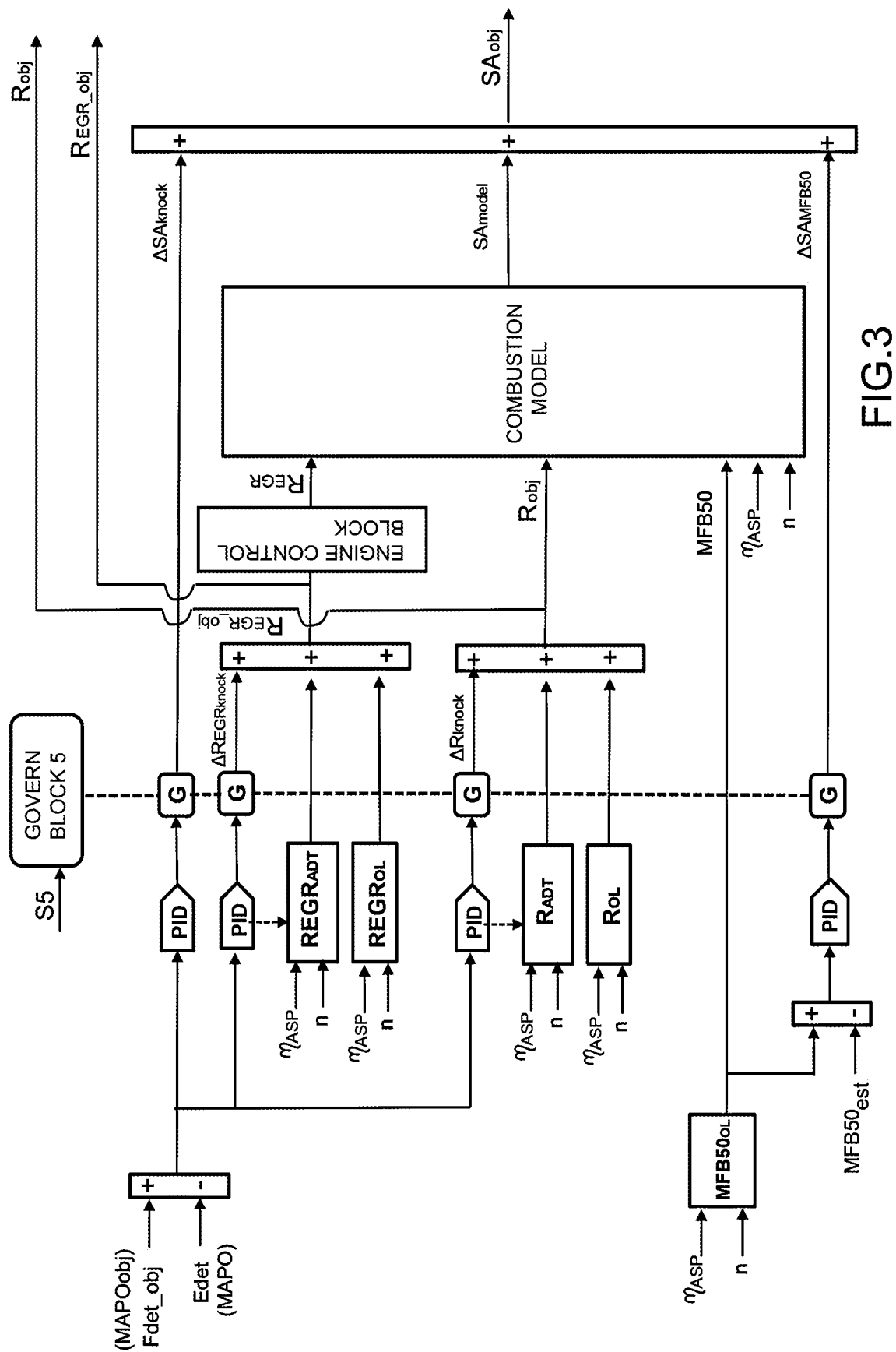
FIG. 3 is a block diagram representing a second variant of the combustion control strategy operated by an electronic control unit of the engine of FIG. 1.

More in detail, according to FIG. 3, the quantity $R_{EGR}$ represents the direct measure or the estimation of the incidence of the gas flow coming from the low-pressure circuit $EGR_{LP}$ relative to the (total) gas mixture flowing in the intake duct 6 (inside the "engine control block" shown in FIG. 3); the gas flow coming from the low-pressure circuit $EGR_{LP}$ is obtained from the position of the EGR valve 16 and from the conditions of the internal combustion engine (in particular, pressure, temperature); the position of the EGR valve 16 is operated by the engine control unit depending on an objective value of the quantity (or ratio) $R_{EGR\_OBJ}$, which is calculated as described below. In an alternative form, the quantity $R_{EGR}$ is determined (estimated) depending on the objective value of the quantity $R_{EGR\_OBJ}$ (for example, filtering the objective value of the quantity $R_{EGR\_OBJ}$ by means of a first order filter).

According to FIG. 3, the combustion model used calculates the spark advance $SA_{model}$ depending on the (known) intake efficiency $\eta_{ASP}$, on the (known) speed n of the internal combustion engine 1, on the combustion index MFB50, on the water rate $R_{obj}$ and on the quantity $R_{EGR}$.

In other words, the combustion model calculating the spark advance $SA_{model}$ can be expressed as follows:

$$SA_{model}=f(MFB50,\eta_{ASP},n,R_{obj},R_{EGR})$$

According to a preferred embodiment, the combustion model can be expressed by means of the usual parabola formulated as follows:

$$SA_{model}=a_2*MFB50^2+a_1*MFB50+a_0$$

Wherein $SA_{model}$ e MFB50 have the meaning explained above, whereas the coefficients $a_i$ can be expressed as follows:

$$a_i=f_i(\eta_{ASP},n)*k_i(R_{EGR},\eta_{ASP})\cdot g_i(R_{obj},\eta_{ASP})[i=0,1,2]$$

Wherein $R_{EGR}$, $R_{obj}$, n and $\eta_{ASP}$ have the meaning explained above.

The values of n and $\eta_{ASP}$ are known to the electronic control unit. Whereas $f_i$ and $k_i$ represent maps experimentally processed in a preliminary phase and variable depending on $\eta_{ASP}$, n, $R_{EGR}$.

According to a further embodiment, the combustion model can be expressed by means of the usual parabola formulated as follows:

$$SA_{model}=a_4*MFB50^2+a_3*MFB50+f(R_{EGR},\eta_{ASP})$$

Wherein $SA_{model}$ MFB50 have the meaning explained above, whereas the coefficients $a_i$ can be expressed as follows:

$$a_i=f_i(\eta_{ASP},n)\cdot g_i(R_{obj},\eta_{ASP})[i=3,4]$$

Wherein $R_{obj}$, n and $\eta_{ASP}$ have the meaning explained above.

The values of n and $\eta_{ASP}$ are known to the electronic control unit. Whereas $f_i$ and $k_i$ represent, according to a preferred embodiment, maps experimentally processed in a preliminary phase and variable depending on $\eta_{ASP}$, n and in the absence of EGR, namely when the quantity $R_{EGR}$ is zero.

Alternatively, $f_i$ and $k_i$ represent maps experimentally processed in a preliminary phase and variable depending on $\eta_{ASP}$, n and in case the quantity $R_{EGR}$ is equal to a reference value determined in a preliminary set-up phase. The combustion index MFB50 and the quantities $R_{obj}$ and $R_{EGR\_OBJ}$ are determined as follows.

The combustion index MFB50 is determined by means of an open-loop contribution; in particular, the electronic control unit 22 stores a map, which, based on the intake efficiency $\eta_{ASP}$ and on the speed n of the internal combustion engine 1, provides the combustion index MFB50.

The quantity $R_{EGR\_OBJ}$ is determined by adding two open-loop contributions $R_{EGR-ADT}$ (if present) and $R_{EGR-OL}$ and the closed-loop contribution $\Delta R_{EGR-KNOCK}$.

Figure 2:
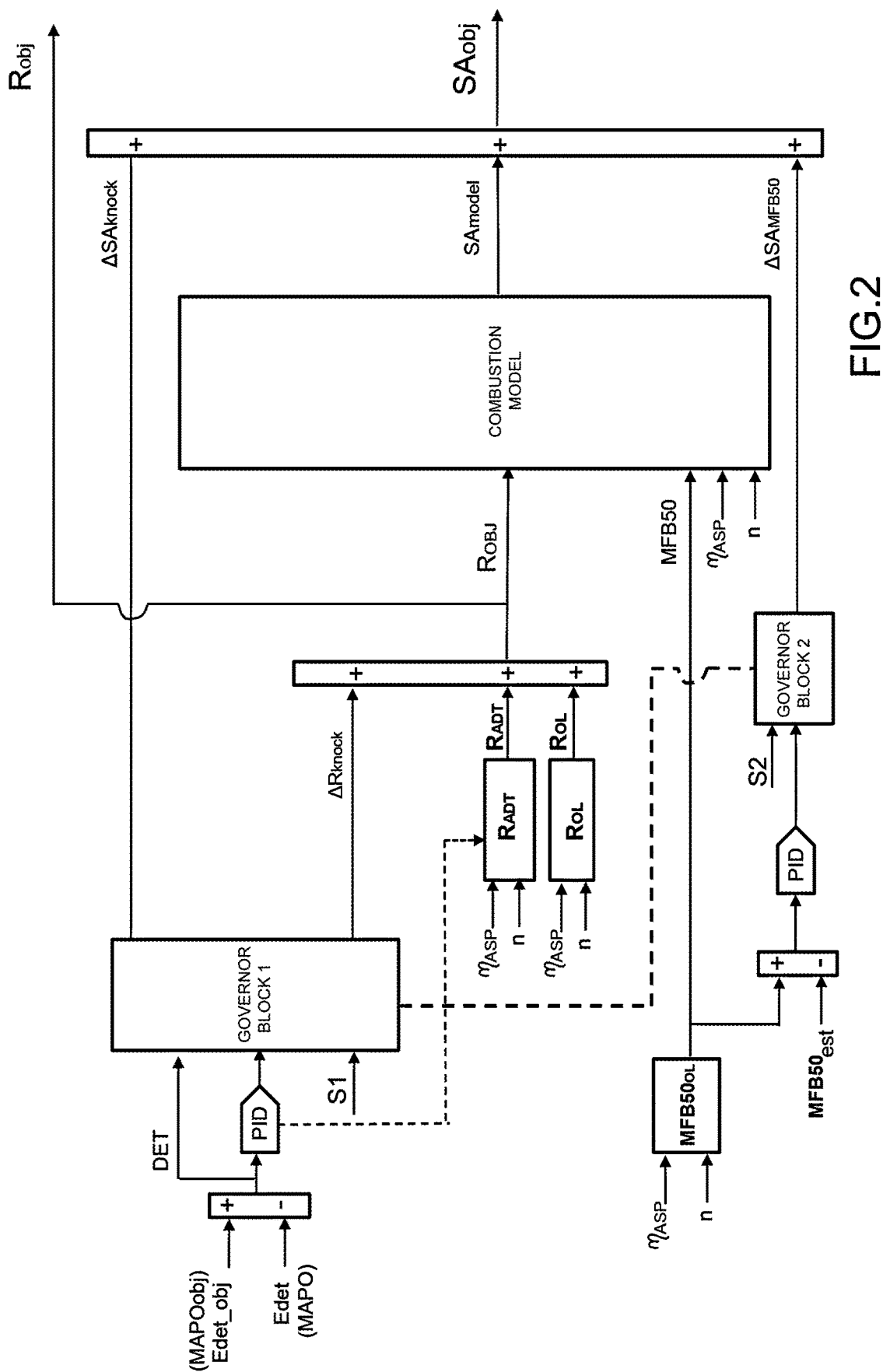
FIG. 2 is a block diagram representing a first variant of the combustion control strategy operated by an electronic control unit of the engine of FIG. 1.

The quantity $R_{obj}$ is also determined by adding two open-loop contribution and a closed-loop (i.e. feedback) contribution, as described in the description above concerning FIG. 2. The quantity $R_{obj}$ is obtained by adding two open-loop contributions $R_{ADT}$ (if present) and $R_{OL}$ and the closed-loop contribution $\Delta R_{KNOCK}$.

The strategy further entails a closed-loop contribution to optimize the efficiency. In particular, said closed-loop contribution is obtained by comparing the combustion index MFB50 determined by means of the open-loop contribution and an estimated value of the combustion index $MFB50_{est}$.

The type of control to be operated is differentiated depending on the result of the comparison between the combustion index MFB50 determined by means of the open-loop contribution and an estimated value of the combustion index $MFB50_{est}$; for example, the type of control takes place differentiating the constants of interventions of a PID (or PI) controller.

In particular, the strategy entails one single governor block 5, which receives, as an input, the contribution calculated through the difference between the combustion index MFB50 and the estimated value of the combustion index $MFB50_{est}$ multiplied by the constants of interventions of the PID or PI controller. The governor block 5, depending on the value assumed by said contribution, decides how to intervene in order to optimize the efficiency of the internal combustion engine 1. In particular, in case the contribution exceeds a threshold value S5 (which can preferably be adjusted and changed based on the engine point), this means that a significant correction is needed in order to optimize the efficiency of the internal combustion engine 1. In this case, the governor block 5 calculates a differential of the spark advance $\Delta SA_{MFB50}$ suited to optimize the efficiency of the internal combustion engine 1.

Again, in order to carry out the knock control and avoid the occurrence of knock phenomena, the differential of the spark advance $\Delta SA_{KNOCK}$ reduces the spark advance $SA_{model}$ provided by the combustion model. On the contrary, in order to optimize the efficiency of the internal combustion engine 1, the differential of the spark advance $\Delta SA_{MFB50}$ increases the spark advance $SA_{model}$ provided by the combustion model. The protection of the internal combustion engine 1 to avoid the occurrence of knock phenomena is preferred at the expense of the efficiency of the internal combustion engine 1; this means that the differential of the spark advance $\Delta SA_{MFB50}$ that is going to optimize the efficiency of the internal combustion engine 1 is reduced to zero (or significantly reduced) when the differential of the spark advance $\Delta SA_{KNOCK}$ suited to avoid the occurrence of knock phenomena intervenes in order to reduce the spark advance $SA_{model}$ provided by the combustion model. In other words, the strategy entails cancelling (or rounding to a value close to zero) the differential of the spark advance $\Delta SA_{MFB50}$ as soon as the differential of the spark advance $\Delta SA_{KNOCK}$ starts reducing the value of the spark advance $SA_{model}$ provided by the combustion model.

Therefore, the objective advance $SA_{obj}$ to be operated is obtained from the sum of two different contributions: the spark advance $SA_{model}$ provided by the combustion model and the differential of the spark advance $\Delta SA_{MFB50}$ suited to optimize the efficiency of the internal combustion engine 1 or, alternatively, the differential of the spark advance $\Delta SA_{KNOCK}$ suited to avoid the occurrence of knock phenomena.

As already mentioned above, the controllers used to determine the closed-loop contributions described above alternatively are PID or PI controllers, in which the constants of intervention are differentiated based on the error; the governor block 5 manages the controllers with priorities of intervention; in particular, the closed-loop contribution on the knocking energy $E_{det}$ (or on the maximum amplitude MAPO of the intensity of the pressure waves generated by the combustion in the cylinders 3), which regulates the low-pressure circuit $EGR_{LP}$, has priority of intervention relative to the water feeding and injection system 18 (basically because the mass $M_{EGR\_LP}$ of exhaust gases recirculated through the low-pressure circuit $EGR_{LP}$ is freely supplied during the normal operation).

As already mentioned above, the intake efficiency $\eta_{ASP}$ can alternatively be replaced by the indicated mean pressure, by the indicated torque or by the brake torque, generally speaking by any quantity representing the engine load.

The combustion control method described above has numerous advantages, since it can easily be implemented for it does not require a high computing burden, is robust and, especially, allows for an optimization of the consumption of injected water, so as to reduce the dimensions of and the space taken up by the water feeding system 18 and so as not to jeopardize the thermodynamic efficiency, and, at the same time, reliably prevents knock phenomena from arising.

The invention claimed is:

1. A method to control combustion of an internal combustion engine having a number of cylinders and a water collection and injection system to introduce water into the internal combustion engine; the method comprises the steps of:
   acquiring rotation speed (n) and intake efficiency ($\eta_{ASP}$) of the internal combustion engine;
   determining a first open-loop contribution ($R_{OL}$) of a water rate (R) equal to a ratio between an injected water mass ($m_{H2o}$) and an injected fuel mass ($m_{FUEL}$) using a control map and depending on the rotation speed (n) and on the intake efficiency ($\eta_{ASP}$);
   determining a first closed-loop contribution ($\Delta R_{KNOCK}$) of the water rate (R) depending on a quantity ($E_{det}$, MAPO) indicating knocking energy;
   calculating an objective value ($R_{obj}$) of the water rate through a sum of the first open-loop contribution ($R_{OL}$) of the water rate (R) and of the first closed-loop contribution ($\Delta R_{KNOCK}$) of the water rate (R);
   determining an open-loop contribution ($MFB50_{OL}$) of a combustion index (MFB50) representing an engine angle where, inside the cylinder, 50% of a fuel mass was burnt using the control map and depending on the rotation speed (n) and on the intake efficiency ($\eta_{ASP}$);
   determining, in a designing phase, a combustion model providing a spark advance value ($SA_{model}$) depending on the objective value ($R_{obj}$) of the water rate, on the rotation speed (n), on the intake efficiency ($\eta_{ASP}$) and on the open-loop contribution ($MFB50_{OL}$) of the combustion index (MFB50);
   calculating a first closed-loop contribution ($\Delta SA_{MFB50}$) of the spark advance, which is suited to optimize efficiency of the internal combustion engine, depending on the combustion index (MFB50);
   calculating a second closed-loop contribution ($\Delta SA_{KNOCK}$) of the spark advance, which is suited to avoid occurrence of knocking phenomena, depending on a quantity ($E_{det}$, MAPO) indicating the knocking energy; and
   calculating an objective value ($SA_{obj}$) of a spark advance angle to be operated through the sum of the spark advance value ($SA_{model}$) provided by the combustion model, of the first closed-loop contribution ($\Delta SAMFB50$) of the spark advance and of the second closed-loop contribution ($\Delta SA_{KNOCK}$) of the spark advance.

2. The method according to claim 1, wherein the second closed-loop contribution ($\Delta SA_{KNOCK}$) of the spark advance reduces the spark advance value ($SA_{model}$) provided by the combustion model and the first closed-loop contribution ($\Delta SA_{MFB50}$) of the spark advance increases or reduces the spark advance value ($SA_{model}$) provided by the combustion model so as to determine the current value of the first closed-loop contribution ($\Delta SA_{MFB50}$) of the spark advance, when the second closed-loop contribution ($\Delta SA_{KNOCK}$) of the spark advance starts reducing the spark advance value ($SA_{model}$) provided by the combustion model.

3. The method according to claim 1 and comprising the further steps of:
   determining a second open-loop contribution ($R_{ADT}$) of the water rate (R) by means of an adaptive control map depending on the rotation speed (n) and on the intake efficiency ($\eta_{ASP}$) of the integral part of a PID/PI controlled used in the first closed-loop contribution ($\Delta R_{KNOCK}$) of the water rate (R) in stationary conditions; and
   calculating the objective value ($R_{obj}$) of the water rate through the sum of the first open-loop contribution ($R_{OL}$), of the second open-loop contribution ($R_{ADT}$) and of the first closed-loop contribution ($\Delta R_{KNOCK}$).

4. The method according to claim 1, wherein the quantity ($E_{det}$) indicating the knocking energy used to determine the first closed-loop contribution ($\Delta R_{KNOCK}$) of the water rate (R) is the knocking energy ($E_{det}$) defined through the difference between the combustion noise and a limit value of the combustion noise.

5. The method according to claim 1, wherein the quantity (MAPO) indicating the knocking energy used to determine the first closed-loop contribution ($\Delta R_{KNOCK}$) of the water rate (R) is the maximum amplitude (MAPO) of the intensity of the pressure waves generated by the combustion in the cylinders (3).

6. The method according to claim 1 and comprising the further steps of:
   calculating a first difference between the quantity ($E_{det}$, MAPO) indicating the knocking energy of the combustion cycle that just took place and a respective limit value ($E_{det-obj}$, $MAPO_{obj}$) of the knocking energy; and
   either determining the first closed-loop contribution ($\Delta R_{KNOCK}$) of the water rate (R) in case said first difference or said first closed-loop contribution ($\Delta R_{KNOCK}$) is smaller than a first threshold value (S1); or determining the second closed-loop contribution ($\Delta SA_{KNOCK}$) of the spark advance in case said first difference or said first closed-loop contribution ($\Delta R_{KNOCK}$) is greater than or equal to the first threshold value (S1).

7. The method according to claim 6, wherein said first difference is multiplied by intervention gains of a regulator, which are variable depending on the first difference.

8. The method according to claim 6 and comprising the further step of rounding down the second closed-loop contribution ($\Delta SA_{KNOCK}$) of the spark advance to a minimum value in case relevant knocking events are detected.

9. The method according to claim 1, wherein the combustion model is expressed by means of a parabola formulated as follows:

$SA_{model} = a_2 * MFB50^2 + a_1 * MFB50 + a_0$

MFB50 combustion index;

$SA_{model}$ spark advance value provided by the combustion model.

10. The method according to claim 9 and wherein the $a_i$ coefficients are expressed as follows:

$a_i = f_i(\eta_{ASP}, n) + g_i(R_{obj}, \eta_{ASP})$ [i=0, 1, 2]

$R_{obj}$ objective value of the water rate;

n rotation speed, $\eta_{ASP}$ intake efficiency.

11. The method according to claim 9, wherein the combustion model is expressed by means of a parabola formulated as follows:

$SA_{model} = a2 * MFB50^2 + a1 * MFB50 + a0$

MFB50 combustion index;

$SA_{model}$ spark advance value provided by the combustion model, $a_i$ coefficients expressed as follows:

$a_i = f_i(\eta_{ASP}, n) + g_i(R_{obj}, \eta_{ASP}) + h_i(R_{EGR}, \eta_{ASP})$ [i=0, 1, 2]

$R_{obj}$ objective value of the water rate;

$R_{EGR}$ quantity representing the incidence of the low-pressure EGR circuit ($EGR_{LP}$);

n rotation speed, $\eta_{ASP}$ intake efficiency.

12. The method according to claim 9, wherein the combustion model is expressed as follows:

$SA_{model} = a4 * MFB50^2 + a3 * MFB50 + f(R_{EGR}, \eta_{ASP})$

MFB50 combustion index;

$SA_{model}$ spark advance value provided by the combustion model;

$a_i$ coefficients expressed as follows:

$a_i = f_i(\eta_{ASP}, n) * g_i(R_{obj}, \eta_{ASP})$ [i=3, 4]

$R_{obj}$ objective value of the water rate;

$R_{EGR}$ quantity representing the incidence of the low-pressure EGR circuit ($EGR_{LP}$);

n rotation speed, $\eta_{ASP}$ intake efficiency.

13. The method according to claim 1, wherein the internal combustion engine (1) includes a low-pressure EGR circuit ($EGR_{LP}$); the method comprises the further steps of determining a first open-loop contribution ($R_{EGR-OL}$) of a quantity ($R_{EGR}$) representing the incidence of the low-pressure EGR circuit ($EGR_{LP}$) on the gas mixture flowing in an intake duct (6) using a control map and depending on the rotation speed (n) and on the intake efficiency ($\eta_{ASP}$);

determining a first closed-loop contribution ($\Delta R_{EGR-KnOCK}$) of said quantity ($R_{EGR}$) depending on the quantity ($E_{det}$, MAPO) indicating the knocking energy;

calculating the objective value ($R_{EGR-obj}$) of said quantity through the sum of the first open-loop contribution ($R_{EGR-OL}$) and of the first closed-loop contribution ($\Delta R_{EGR-KnOCK}$);

determining the quantity ($R_{EGR}$) representing the incidence of the low-pressure EGR circuit ($EGR_{LP}$) on the gas mixture flowing in the intake duct (6) depending on the objective value ($R_{EGR-obj}$) of said quantity; and determining, in a designing phase, the combustion model that provides a spark advance value ($SA_{model}$) depending on said quantity ($R_{EGR}$) representing the incidence of the low-pressure EGR circuit ($EGR_{LP}$) on the gas mixture flowing in the intake duct (6).

14. The method according to claim 13 and comprising the further steps of:

determining a second open-loop contribution ($R_{EGR-ADT}$) of said quantity using an adaptive control map depending on the rotation speed (n) and on the intake efficiency ($\eta_{ASP}$) of the integral part of a PID/PI controlled used in the first closed-loop contribution ($\Delta R_{EGR-KNOCK}$) of said quantity ($R_{EGR}$) in stationary conditions; and calculating the objective value ($R_{EGR-obj}$) of said quantity through the sum of the first open-loop contribution ($R_{EGR-OL}$), of the second open-loop contribution ($R_{EGR-ADT}$) and of the first closed-loop contribution ($\Delta R_{EGR-KNOCK}$).

15. The method according to claim 13 and comprising the further steps of:

calculating a second difference between the quantity ($E_{det}$, MAPO) indicating the knocking energy of the combustion cycle that just took place and a respective limit value ($E_{det-obj}$, $MAPO_{obj}$) of the knocking energy; and either determining a second closed-loop contribution ($\Delta R_{EGR-KNOCK}$) in case the second difference or said second closed-loop contribution ($\Delta R_{EGR-KNOCK}$) is smaller than a second threshold value (S3); or determining the second closed-loop contribution ($\Delta SA_{KNOCK}$) of the spark advance in case said second difference or said second closed-loop contribution ($\Delta R_{EGR-KNOCK}$) is greater than the first threshold value (S1).

16. The method according to claim 15, wherein the second threshold value (S3) is smaller than or equal to the first threshold value (S1).

17. The method according to claim 16, wherein first closed-loop contribution ($\Delta R_{KNOCK}$) of the water rate (R) is equal to zero in case said second difference or said second closed-loop contribution ($\Delta R_{EGR-KnOCK}$) is smaller than the second threshold value (S3).

18. The method according to claim 15, wherein said second difference is multiplied by intervention constants of a regulator, which are variable depending on the second difference.

* * * * *